July 11, 1967   R. W. ROBERTS   3,330,566
ROTARY SEAL STRUCTURE FOR VALVE PLATE CONSTRUCTION
Filed Nov. 18, 1963
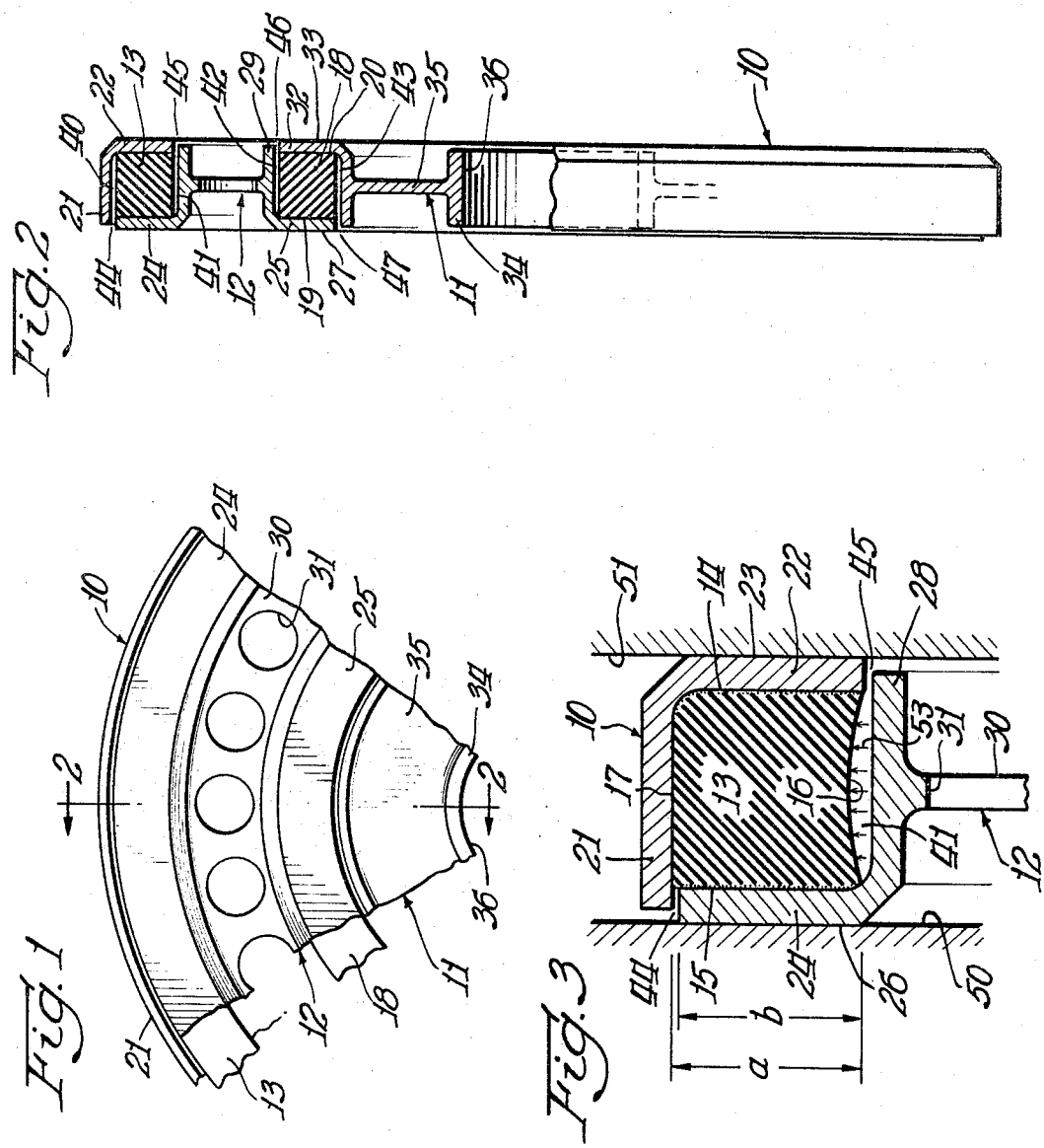
Inventor:
Richard W. Roberts
By: Robert L. Zieg

United States Patent Office 3,330,566
Patented July 11, 1967

3,330,566
ROTARY SEAL STRUCTURE FOR VALVE PLATE
CONSTRUCTION
Richard W. Roberts, Lombard, Ill., assignor to Borg-Warner Corporation, Chicago, Ill., a corporation of Illinois
Filed Nov. 18, 1963, Ser. No. 324,288
2 Claims. (Cl. 277—92)

This invention relates to a rotary seal structure for hydraulically operated devices, and more particularly this invention relates to a rotary valve plate for a hydraulic pump or motor.

One of the objects of this invention is to provide an effective fluid pressure seal between relatively rotating surfaces within a hydraulic apparatus such as a fluid pump, motor, transmission or the like. The invention is especially adapted to be used in conjunction with a valve plate of a hydraulic device wherein the valve plate has parallel radially extending surfaces on each side adapted to mate with relatively rotating surfaces within the hydraulic device to provide an effective seal and thereby prevent a loss of fluid pressure within the hydraulic device.

The rotary valve plate of the present invention includes thin metal seal rings having two parallel mating surfaces thereon and rubber or similar deformable material separating the metal rings and bonded thereto. Due to the construction of the valve plate and the resiliency of the deformable material an effective seal is maintained, since the valve plate will automatically compensate for variations in spacing or out-of-parallelism of the relatively rotating surfaces.

Further objects and advantages of the present invention will be apparent from the following description, reference being had to the accompanying drawings, wherein preferred forms of the present invention are clearly shown.

In the drawings:

FIG. 1 is a partial end view of a rotary valve plate incorporating the features of the present invention;

FIG. 2 is a cross-sectional view taken along the line 2—2 of FIG. 1, showing the complete valve plate construction in a relaxed state with clearances exaggerated for clarity; and FIG. 3 is an enlarged view of the upper portion of FIG. 2, showing the action of one of the rubber annular rings under pressure.

Referring now to FIG. 2, the valve plate of the present invention is shown in a relaxed state with clearances exaggerated for clarity and includes an outer annular metal seal ring 10, inner seal ring 11, and a central ported seal ring 12.

An annular ring 13 made of rubber or similar deformable material has radially extending parallel surfaces 14 and 15. The surface 14 is bonded to the annular seal ring 10 and the surface 15 is bonded to the ported seal ring 12, as illustrated in FIG. 3, showing an enlarged view of a portion of the valve plate with the annular ring 13 under pressure. The annular ring 13 also has parallel axially extending surfaces 16 and 17. The surfaces 16 and 17 are not bonded to the seal rings 10 and 12 as are surfaces 14 and 15.

An annular ring 18 of the same material as ring 13 is bonded to the ported seal ring 12, as indicated at 19, and is also bonded to the seal ring 11, as indicated at 20.

The seal ring 10 is generally L-shaped in cross section with an outer axially extending portion 21 and a radially inwardly extending portion 22 having a bearing surface 23 thereon.

The seal ring 12 includes radially extending portions 24 and 25 having bearing surfaces 26 and 27 respectively thereon. The seal ring 12 also includes parallel axially extending portions 28 and 29 separated by a radially extending connecting portion 30. Portion 30 of the seal ring 12 has ports 31 formed therein to provide fluid communication between two relatively rotating transmission parts.

The annular seal ring 11 includes a radially extending section 32 having a bearing surface 33 and a hub section 34. A connecting portion 35 is provided between the sections 32 and 34. The hub section 34 has a bore 36 formed therein.

Pressure chambers 40, 41, 42 and 43 are defined by the seal rings 10, 11 and 12 and annular rings 13 and 18. Clearances are provided between the sealing rings 10, 11 and 12 of the valve plate, as indicated at 44, 45, 46 and 47 to provide fluid pressure access to the pressure chambers 40, 41, 42 and 43 respectively.

Parallel radial surfaces 50 and 51 are illustrated as two parallel surfaces having relative rotation with respect to the valve plate and engaged by the bearing surfaces 23, 26, 27 and 33 of the valve plate.

The valve plate of the present invention is designed for use in a hydraulically operated transmission and could be used for example as plate 45, illustrated in FIG. 1 of the U.S. Patent to Wahlmark 2,383,429. In this type of use, high pressure fluid will at times be communicated through the ports 31 of the valve plate. When high pressure fluid is communicated through the ports 31, a force must be provided to move the seal rings 10, 11 and 12 axially apart to effect a fluid seal between the surfaces 23, 26, 27 and 33 of the valve plate and relatively rotating surfaces 50 and 51.

As illustrated in FIG. 3, high pressure fluid in port 31 will be communicated through the clearance 45 into pressure chamber 41 and will create a radially outwardly extending force against the lower surface 16 of the annular ring 13, as indicated at 53 by the arrows. Fluid pressure acting on the surface 16 will deform the annular ring 13, as shown in FIG. 3, and will move the seal rings 10 and 12 axially apart and provide a sealing force at the surfaces 23 and 26.

It will be apparent that the amount of sealing force provided by the novel valve plate of the present invention will increase in direct proportion with the amount of fluid pressure applied thereto. Thus, as the fluid pressure increases, the sealing force will increase to prevent a loss of pressure.

The valve plate will provide an effective seal, whether the high pressure fluid exists in the ports 31 and is admitted through clearances 45 and 46, or if the high fluid pressure exists on the opposite sides of the annular rings 13 and 18, and is admitted through clearances 44 and 47.

The distance between the bearing surfaces on the valve plate before the plate is assembled into a transmission is slightly greater than the distance between the exemplary surfaces 50 and 51 within a transmission so that a slight pre-compression of the annular rings 13 and 18 occurs. In this manner minor variances in the distance between surfaces 50 and 51 are compensated for.

As indicated in FIG. 3, by the distance $a$ the projected area of the annular rings 13 and 18 is greater than the area of the sealing surfaces represented by distance $b$, to insure effective sealing.

It is contemplated that the sections of the seal rings 10, 11 and 12 having bearing surfaces thereon are thin and flexible enough to conform to the mating surfaces 50 and 51, even though a limited amount of "out of flatness" may exist on either of the mating surfaces.

In summary, the novel valve plate of the present invention provides a fluid pressure seal which automatically compensates for increasing fluid pressure, wear on the mating surfaces, and irregularities such as out-of-parallelism of the mating surfaces.

While I have described my invention in connection with certain specific embodiments thereof, it is to be understood that this is by way of illustration and not by way of limitation and the scope of my invention is defined solely by the appended claims which should be construed as broadly as the prior art will permit.

I claim:
1. A fluid seal structure for use between two surfaces comprising first and second complementary annular-shaped seal rings together defining an annular space, each of said seal rings having a radially extending portion with a bearing surface thereon engageable with one of said two surfaces; a resilient annular ring interposed between said first and said second annular-shaped seal rings in said annular space in engagement with and bonded to the radially extending portions of said first and second annular-shaped seal rings and defining a first pressure chamber and a second pressure chamber between said resilient annular ring and said first and second annular-shaped seal rings respectively; means to admit fluid under pressure to said first pressure chamber; means to admit fluid under pressure to said second pressure chamber, whereby fluid under pressure in either of said chambers will deform said resilient annular ring and cause axial separation of said first and said second annular-shaped seal rings to urge said seal rings into engagement with said surfaces and establish a fluid seal between said surfaces and said bearing surfaces.

2. A fluid seal structure for use between two surfaces comprising first and second complementary annular-shaped seal rings together defining an annular space, said seal rings each having a radially extending portion having a radial extending bearing surface thereon; a resilient annular ring interposed between said first and second annular-shaped seal rings, the cross-sectional area of said annular resilient ring comprising two radially extending parallel surfaces and two axially extending parallel surfaces, means bonding said annular resilient ring to the radially extending portions of said seal rings along the parallel radially extending surfces of said resilient annular ring; a first pressure chamber formed between one of said parallel axially extending surfaces and one of said annular-shaped seal rings; and a second pressure chamber formed between the other of said axially extending parallel surfaces and the other annular-shaped seal ring; means to admit fluid under pressure to said first pressure chamber; means to admit fluid under pressure to said second pressure chamber whereby fluid under pressure in either of said chambers will deform said resilient annular ring and cause axial separation of said first and said second annular-shaped seal rings to urge said seal rings into engagement with said two surfaces and establish a fluid seal between said two surfaces and said bearing surfaces.

References Cited
UNITED STATES PATENTS

| | | | |
|---|---|---|---|
| 2,438,457 | 3/1948 | Schlosser | 277—65 |
| 3,220,741 | 11/1965 | Mueller | 277—92 |

FOREIGN PATENTS

| | | |
|---|---|---|
| 710,143 | 9/1941 | Germany. |

LAVERNE D. GEIGER, *Primary Examiner.*

J. S. MEDNICK, *Assistant Examiner.*